Figure 1:
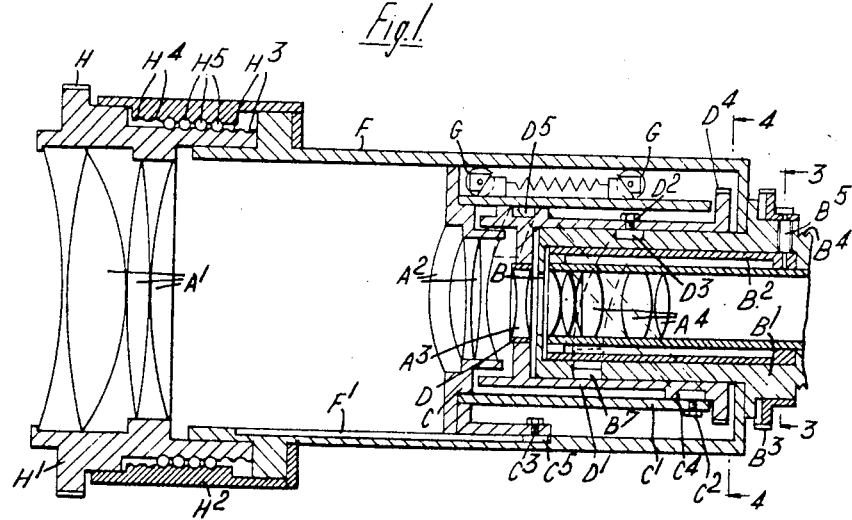

Nov. 7, 1967                    A. CHAPMAN                       3,351,411
           ZOOMING MECHANISMS FOR OPTICAL OBJECTIVES OF VARIABLE
                            EQUIVALENT FOCAL LENGTH
Filed Nov. 18, 1963                                         2 Sheets-Sheet 1

Inventor
Alan Chapman
By
Attorneys

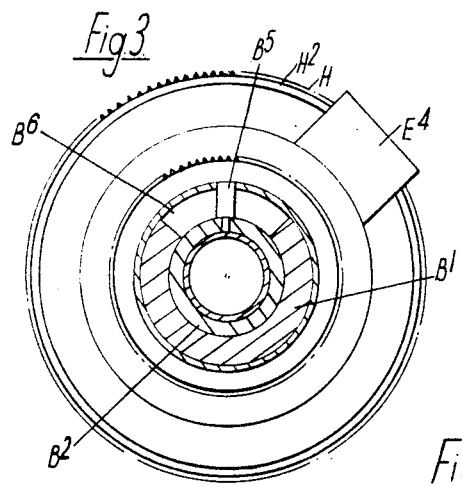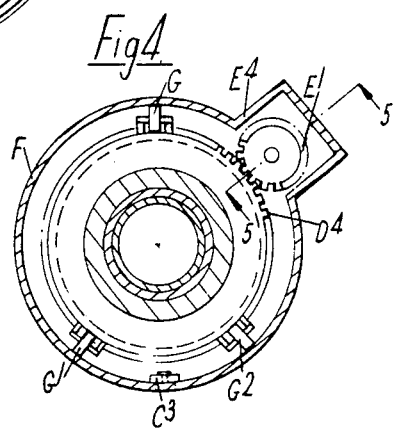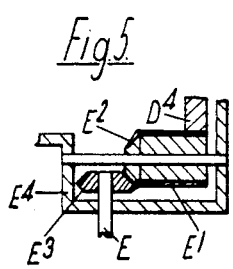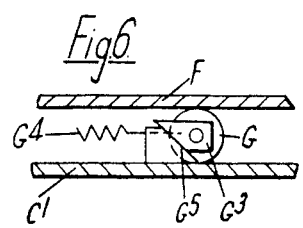
Inventor
Alan Chapman

United States Patent Office 3,351,411
Patented Nov. 7, 1967

3,351,411
ZOOMING MECHANISMS FOR OPTICAL OBJECTIVES OF VARIABLE EQUIVALENT FOCAL LENGTH
Alan Chapman, Leicester, England, assignor to Rank Precision Industries Limited, trading as The Rank Organisation Rank Taylor Hobson Division, Leicester, England, a British company
Filed Nov. 18, 1963, Ser. No. 324,449
Claims priority, application Great Britain, Nov. 16, 1962, 43,441/62
12 Claims. (Cl. 350—187)

This invention relates to an optical objective of the zoom type, that is of the type having relatively movable members whereby under the control of a zoom control element the equivalent focal length of the objective can be continuously varied throughout a range, whilst maintaining constant position of the image plane, whereby the size of the image can be varied. Such zoom objectives usually consist of a front assembly including the members relatively movable for zooming purposes, and a rear assembly which remains stationary during the zooming relative movements, and in the majority of such zoom objectives there are two relatively movable members, although in some instances there are three such movable members. In addition, it is necessary to provide for adjustment to suit different object distances, and this is usually achieved by superimposing an additional independent movement, usually of the front member of the front assembly, on the relative zooming movements, under the control of a focussing control element.

The mechanical problems involved in effecting the desired relative movements and maintaining accurate centering with respect to the optical axis throughout the zooming range and the focussing range are severe, especially in cases in which the ratio between the maximum and minimum values of the equivalent focal length in the zooming range is large, primarily owing to the fact that at least one of the movable members (and usually both or all of them) has to perform a movement bearing a non-linear relationship to the movement of the zoom control element, the departures from linearity of movement usually increasing materially as the zooming range is extended. Moreover, the overall dimensions of the objective are necessarily already large to accommodate the axial movements and to give an adequate field of view, and it is of considerable importance so to arrange the actuating mechanism as to avoid further increase in dimensions as far as possible. The iris diaphragm of the objective is usually located near the front of the rear assembly and the provision of the necessary mechanism for its operation also has to be taken into account in designing the main actuating mechanism.

The non-linearity of movement necessitates the use of some form of cam device and it is especially convenient to employ a cam groove or slot in a tubular element in cooperation with a projection (usually carrying a ball or roller) on another element, one of the two elements being rotated about the optical axis whilst the other is held against rotation. In order to avoid undue increase in the driving torque, the cam shape must not be too steep, and this in turn calls for an increase in the angle of relative rotation of the two elements throughout the range. In the case of a cam slot passing right through the wall of the tubular element a cam slot extending over a large rotational angle tends to weaken the tube and give it a degree of longitudinal springiness which reduces the accuracy of the axial movement to be transmitted, so that it is usually preferable to use a cam groove rather than a cam slot. This in turn raises the further complication that, in view of the difficulty of cutting an internal cam groove in a tube with a sufficiently high degree of accuracy, it is desirable to use an external cam groove, rather than an internal cam groove whenever it is practicable to do so.

The present invention has for its object to provide means whereby such mechanical problems can be materially reduced, so that it is practicable to provide a relatively simple actuating mechanism for the zooming relative movements without undue increase in the overall dimensions of the objective.

The optical objective of the zoom type, according to the present invention, comprises a front assembly which includes two members axially movable for zooming purposes, and a normally stationary rear assembly behind the front assembly, and in which the two movable members of the front assembly are respectively carried by two axially movable concentric tubes coupled together through a cam groove coupling, one of such tubes being held against rotation, whilst the other is caused to rotate by operation of the zoom control element and is coupled through a cam groove coupling with a stationary element.

The cam groove coupling between the two axially movable tubes is preferably constituted by an inward projection on the outer tube engaging in a cam groove in the outer surface of the inner axially movable tube.

Whilst it is practicable to hold the inner axially movable tube against rotation and to rotate the outer axially movable tube, it will usually be more convenient to hold the outer movable tube against rotation and to rotate the inner movable tube, in which case the inner movable tube is preferably provided with an inward projection engaging in a cam groove on the outer surface of a stationary inner tube.

Accurate centering of the two axially movable tubes is preferably effected, at least in part, by mounting the outer movable tube in bearing engagement with the inner surface of a stationary outer tube, and mounting the inner movable tube in bearing engagement with the outer surface of a stationary inner tube. Additional bearing support for the axially movable tubes may be obtained, if desired, by mounting such tubes in bearing engagement with one another.

When, as will often be the case, the iris diaphragm of the objective is mounted near the front surface of the stationary rear assembly, the stationary inner tube (whether for carrying the cam groove or for affording a bearing surface or both) may conveniently be constituted by a tube which houses the mechanism for operating the iris diaphragm and also at least part of the stationary rear assembly. The use of such stationary housing tube for carrying a cam groove on its outer surface for controlling the movement of one of the axially movable members, in itself forms the subject of the present applicants' copending United States Patent Application Ser. No. 323,794, Nov. 14, 1963.

Whilst plain sliding bearings may be used for the various parts in bearing engagement with one another, it is sometimes preferable, especiallly in the case of a relatively heavy axially movable member, to utilise the invention forming the subject of the present applicants' copending United States Patent Application Ser. No. 324,049, Nov. 15, 1963 for the bearing engagement between the outer axially movable tube and the stationary outer tube, in which case such outer movable tube is held against rotation, in which case the outer axially movable tube carries three pairs of ball-mounted rollers, the two rollers of each pair being spaced apart in the longitudinal direction, whilst the three pairs are angularly spaced apart around the optical axis. In such case, preferably, the two rollers of one pair are mounted to be relatively movable in the longitudinal direction and are spring-urged into engagement respectively with two inclined guide faces whereby the longitudinal spring force is converted into a radial thrust.

Figure 2:
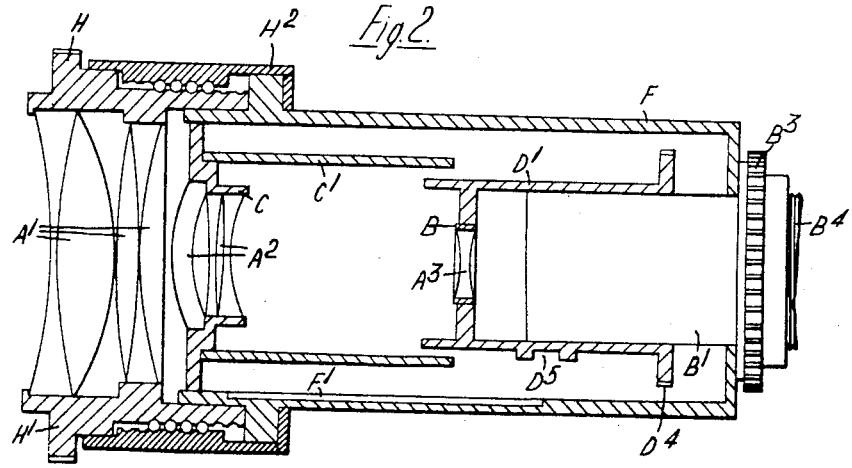

The invention may be carried into practice in various ways, but a preferred arrangement of zoom objective according thereto is illustrated in the accompanying drawings, by way of example. In the drawings, FIGURE 1 is an axial sectional view of this arrangement showing the member of the objective in the operative position at one end of the zooming range, FIGURE 2 is a similar view showing the objective members in the operative position at the other end of the zooming range, FIGURES 3 and 4 are transverse sections taken respectively on the lines 3—3 and 4—4 of FIGURE 1, FIGURE 5 is a partial section on the line 5—5 of FIGURE 4, and FIGURE 6 shows a detail on a larger scale.

In this arrangement, the zoom objective comprises a front assembly consisting of a front member $A^1$, which is normally stationary but can be axially moved for focussing purposes, followed by two movable members $A^2$, $A^3$ to which non-linear axial movements are imparted for zooming purposes, and a stationary rear assembly $A^4$, the iris diaphragm (diagrammatically indicated at B) being located in a stationary position between the front and rear assemblies. The axial space between the iris diaphragm B and the front member $A^1$, when in its rearmost focussing position, is made just sufficient to accommodate the full range of movement of the two movable members $A^2$, $A^3$. For optical reasons, the diameter of the front member $A^1$ will in practice usually be considerably greater than those of the two movable members $A^2$, $A^3$ and that of the rear member $A^4$. This particunlar arrangement is suited more especially to a zoom objective wherein the front movable member $A^2$ performs a considerably greater axial movement than the rear movable member $A^3$. Although the various members of the objective may be arranged in other ways, the particular example illustrated corresponds to Example I described in the specification of the copending United States Patent Application Ser. No. 309,208 assigned to the assignees of the present application Sept. 16, 1963. In this example, the front member $A^1$ consists of a meniscus doublet component followed by two convergent simple components, the movable second member $A^2$ consists of a meniscus simple component followed by a triplet component, the movable third member $A^3$ consists of a doublet component, and the stationary rear assembly $A^4$ consists of three simple convergent components followed by a divergent simple component and a doublet component.

The operation of the iris diaphragm B is effected, in the well-known manner, by the relative movement between two elements, one of which is stationary and the other rotatable, and in the present arrangement these two elements are constituted by a rotatable tube $B^2$ concentrically mounted within a stationary housing tube $B^1$, the two tubes extending rearwardly from the diaphragm B around the rear assembly $A^4$ to the iris diaphragm control element $B^3$, the arrangement being such that the stationary housing tube $B^1$ is rigidly mounted with accurate centering on the optical axis of the objective. The iris diaphragm control element $B^3$ is rotatably mounted on the diaphragm housing tube $B^1$ which is held stationary by screwing, at $B^4$, into part of the stationary casing (not shown) of the complete objective, and is connected by a pin $B^5$, passing through a slot $B^6$ (see FIGURE 3) in the housing tube $B^1$ to the rotatable inner tube $B^2$ for operating the diaphragm B itself.

The mounts C and D, respectively for the two members $A^2$ and $A^3$ of the objective movable for zooming purposes, are rigidly connected respectively to two concentric tubes $C^1$ and $D^1$, which extend rearwardly around the stationary housing tube $B^1$ for the iris diaphragm mechanism. The inner of such tubes $D^1$, connected to the member $A^3$, has an inwardly projecting pin $D^2$ carrying a roller $D^3$, which engages in a cam groove $B^7$ in the outer surface of the stationary housing tube $B^1$ for the iris diaphragm, the shape of such cam groove being such as to give the desired axial movement to the second movable member $A^3$, when such member and the inner concentric tube $D^1$ are rotated around it. For the purposes of such rotation, the inner concentric tube $D^1$ is provided at its rear end (beyond the end of the outer concentric tube $C^1$) with a ring of gear teeth $D^4$ engaging with a pinion $E^1$ (see FIGURES 4 and 5) connected to the zoom control element E, here shown as a shaft, through bevel gearing $E^2$, $E^3$. The ring of gear teeth $D^4$ or (as shown) the pinion $E^1$ has an axial length adequate to cover the full axial travel of the member $A^3$. The mechanism for driving the ring of gear teeth $D^4$ is housed in a box $E^4$ mounted on one side of the objective casing F.

The outer concentric tube $C^1$ carries two pins $C^2$ and $C^3$ respectively directed inwardly and outwardly and carrying rollers $C^4$ and $C^5$. The roller $C^5$ engages in a longitudinal groove $F^1$ in the stationary outer casing F and thus holds the tube $C^1$ against rotation. The roller $C^4$ engages in a cam groove $D^5$ formed on the outer surface of the inner tube $D^1$ whereby, when the tube $D^1$ is rotated, the outer concentric tube $C^1$ will be caused to move axially relatively to the inner concentric tube. The shape of such cam groove $D^5$ is such that the axial movement of the outer concentric tube $C^1$ relatively to the inner concentric tube $D^1$ added to the axial movement of the inner concentric tube $D^1$ relatively to the stationary housing tube $B^1$ around the iris diaphragm mechanism, amounts to the desired axial movement to be imparted to the first of the two movable members $A^2$.

The outer concentric tube $C^1$ constitutes or supports a carriage, which is provided with three pairs of rollers G, $G^1$, $G^2$ running along the internal surface of the stationary tubular casing F, the two rollers of each pair being longitudinally spaced apart from one another. The three pairs of rollers are arranged in isosceles triangle formation around the carriage, the apex angle of the isosceles triangle being of the order of 45 degrees, such apex being diametrically opposite to the outwardly directed roller pin $C^3$ on the outer concentric tube $C^1$, so that the other two pairs of rollers $G^1$, $G^2$ are equally spaced angularly on either side of such roller pin. Each roller is located between and journalled on two balls mounted on the carriage, the axes of rotation of all the rollers lying in planes at right angles to the optical axes and extending at right angles to radial lines through such axis.

In order to ensure proper engagement of all the rollers with the inner surface of the stationary tubular casing F, the two rollers of the pair G at the apex of the isosceles triangle are mounted respectively on supports $G^3$ (see FIGURE 6) movable relatively to one another on the carriage, such supports being urged towards one another by a pair of springs $G^4$. Each of these two supports $G^3$ abuts against a face $G^5$ on the carriage inclined at 45 degrees, so that the spring force tends to make the two supports $G^3$ ride up the inclined faces to ensure proper engagement of the rollers with the stationary tubular casing F, the longitudinal spring force on the two rollers G thus being converted into a radial thrust against the wall of the casing F. It will be clear that this carriage mounting, not only ensures free movement of the carriage along the tubular casing with greatly reduced driving torque imposed on the two cam grooves $D^5$ and $B^7$, but also ensures accurate centering of the first movable member $A^2$ on the optical axis of the objective.

Accurate centering of the second movable member $A^3$ is ensured by mounting the tube $D^1$ in sliding engagement with the surface of the stationary housing tube $B^1$ for the iris diaphragm mechanism, and is also assisted by mounting the two concentric tubes $C^1$, $D^1$ in sliding engagement with each other.

The front member A¹ of the front assembly, which will usually have a diameter considerably greater than those of the two members A², A³ axially movable for zooming purposes and may be of relatively complex construction, so that it is of necessity heavy and bulky, normally remains stationary during the zooming relative movements, but is axially movable for focussing on to the object under the control of a focussing control element H. Here again it is important to minimise the driving torque necessary to effect such axial movement. For this purpose, in the example illustrated, the mount H¹ for the front member A¹ is directly connected to the focussing control element H and is mounted in a screwthread of the ball type in a stationary outer tube H². Such screwthread is constituted by a helical groove H³ on the outer surface of the mount H¹ located opposite to a helical groove H⁴ on the inner surface of the stationary outer tube H², the two cooperating helical grooves engaging with one another through a set of bearing balls H⁵.

The focussing movement of the member A¹ may be effected in various other ways. For example, the focussing control element may be connected to the outer tube, so that such tube rotates, the member A¹ being held against rotation, or the member A¹ may be moved axially by means of a cam groove and roller coupling with the outer tube, the driving torque being reduced by mounting the member A¹ in a carriage with ball-mounted rollers arranged similarly to the rollers G, G¹, G² above described.

It will be appreciated that the foregoing arrangement has been described by way of example only and may be modified in various ways within the scope of the invention. Thus, for instance, the inner of the two concentric tubes may be held against rotation by means of an inwardly projecting roller engaging in a longitudinal groove in the surface of the stationary housing tube for the iris diaphragm mechanism, whilst the tubular casing is rotated under the control of the zoom control element carrying with it the outer concentric tube, the axial movement of the inner concentric tube and of the second movable member being brought about by providing a second cam groove on the outer surface of the inner concentric tube for engagement by a roller on a pin projecting inwardly from the tubular outer casing. Again, the invention can be applied to types of zoom objective (having two members relatively movable for zooming purposes) other than that described above.

What I claim as my invention and desire to secure by Letters Patent is:

1. In an optical objective of the zoom type, comprising a normally stationary rear assembly, a front assembly including two members axially movable relative to said rear assembly for continuously varying the equivalent focal length of the objective throughout a range whilst maintaining constant position of the image plane of the objective, and a zoom control element for controlling the axial movement of the said two members of the front assembly for zooming purposes, the improvement which comprises two concentric tubes respectively carrying the said two axially movable members of the front assembly, a cam-groove coupling interconnecting such two tubes, said coupling comprising a cam groove in one of said tubes and a protuberance carried by the other of said tubes, means for holding one of such two tubes against rotation, a stationary element, a cam-groove coupling comprising a cooperating protuberance and cam groove interconnecting the other of such tubes and the stationary element, and means driven by the zoom control element which rotates such other tube and thereby causes axial movement of the said two members of the front assembly the cam groove of said last mentioned coupling being shaped to impart to said other tube when rotated the axial movement required of the member carried by that tube for zooming purposes while the cam groove of the coupling interconnecting said tubes is shaped to impart to said one tube an axial movement relative to said other tube equal to the difference between the axial movements required of said two members for zooming purposes.

2. An optical objective as claimed in claim 1, in which the cam-groove coupling between the two concentric tubes is constituted by a cam groove in the outer surface of the inner of such tubes and an inward projection on the outer of such tubes engaging in such cam groove.

3. An optical object as claimed in claim 2, including a stationary outer tube surrounding the outer of the said two concentric tubes and in bearing engagement therewith, and a stationary inner tube within the inner of the two concentric tubes and in bearing engagement therewith, the two concentric tubes being in bearing engagement with one another.

4. An optical objective as claimed in claim 3, including an iris diaphragm between the front and rear assemblies of the objective, operating mechanism for such iris diaphragm, and a stationary tube housing such operating mechanism and at least part of the rear assembly, such housing tube constituting the said stationary inner tube within the inner of the two concentric tubes.

5. An optical objective as claimed in claim 1, including a stationary outer tube surrounding the outer of the two concentric tubes and in bearing engagement therewith, and a stationary inner tube within the inner of the two concentric tubes and in bearing engagement therewith.

6. An optical objective as claimed in claim 5, including an iris diaphragm between the front and rear assemblies of the objective, operating mechanism for such iris diaphragm, and a stationary tube housing such operating mechanism and at least part of the rear assembly, such housing tube constituting the said stationary inner tube within the inner of the two concentric tubes.

7. In an optical objective of the zoom type, comprising a normally stationary rear assembly, a front assembly including two members axially movable relative to said rear assembly for continuously varying the equivalent focal length of the objective throughout a range whilst maintaining constant position of the image plane of the objective, and a zoom control element for controlling the axial movements of the said two members of the front assembly for zooming purposes, the improvement which comprises two axially movable concentric tubes respectively carrying the said two axially movable members of the front assembly, a cam-groove coupling interconnecting such two concentric tubes, said coupling comprising a cam groove in one of said tubes and a protuberance carried by the other of said tubes, a stationary outer tube surrounding the two concentric tubes, a coupling between such stationary outer tube and the outer of the two axially movable tubes for holding the latter against rotation, a stationary inner tube within the inner of the two axially movable tubes and having a cam-groove on its outer surface, an inward projection on the inner of the two axially movable tubes engaging in such cam groove, and means whereby the zoom control element causes rotation of the inner of the two axially movable tubes and thereby causes axial movement of the said two axially movable members of the front assembly, said last mentioned cam groove being shaped to impart to the inner of the two axially movable tubes when rotated the axial movement required of the member carried by that tube for zooming purposes while the cam groove of the coupling interconnecting said two axially movable tubes is shaped to impart to the outer of the two axially movable tubes an axial movement relative to said inner rotatable tube equal to the difference between the axial movements required of said two members for zooming purposes.

8. An optical objective as claimed in claim 7, including means for maintaining the outer of the two concentric tubes in bearing engagement with the stationary outer tube, and means for maintaining the inner of such concentric tubes in bearing engagement with the stationary inner tube.

9. An optical objective as claimed in claim 8, in which the cam-groove coupling between the said two concentric tubes is constituted by a cam groove in the outer surface of the inner of such tubes and an inward projection on the outer of such tubes engaging in the cam groove, the two concentric tubes being in bearing engagement with one another.

10. An optical objective as claimed in claim 8, in which the means for maintaining the outer concentric tube in bearing engagement with the stationary outer tube comprises three pairs of ball-mounted rollers carried by the outer concentric tubes and engaging with the inner surface of the stationary outer tube, the two rollers of each pair being spaced apart from one another in the direction of the length of the tubes, and the three pairs being angularly spaced from one another around the common axis of the concentric tubes, such common axis being constituted by the optical axis of the objective.

11. An optical objective as claimed in claim 10, including relatively movable supporting elements respectively for the two rollers of one of the three pairs, spring means for urging such two supporting elements to move towards one another, and two inclined faces constituting abutments respectively for such two supporting elements whereby the longitudinal spring force is converted into a radial thrust for holding the rollers in proper engagement with the inner surface of the stationary outer tube.

12. An optical objective as claimed in claim 8, including an iris diaphragm between the front and rear assemblies of the objective, operating mechanism for such iris diaphragm, and a stationary tube housing such operating mechanism and at least part of the rear assembly, such housing tube constituting the said stationary inner tube within the inner of the two concentric tubes.

References Cited
UNITED STATES PATENTS

| | | | |
|---|---|---|---|
| 3,004,471 | 10/1961 | Cook | 88—57 |
| 3,058,391 | 10/1962 | Leupold | 88—57 |
| 3,090,282 | 5/1963 | Angenieux | 88—57 |

OTHER REFERENCES

Mahn, German App. No. 1,120,236, Pub. Dec. 21, 1961, Class 88—57.

JEWELL H. PEDERSEN, *Primary Examiner.*

J. K. CORBIN, *Examiner.*